United States Patent [19]

Watson

[11] Patent Number: 4,627,413

[45] Date of Patent: Dec. 9, 1986

[54] THREE POSITION FIREPLACE COOKER

[75] Inventor: Gary Q. Watson, El Paso, Tex.

[73] Assignee: ROCA Technologies, Inc., San Antonio, Tex.

[21] Appl. No.: 792,678

[22] Filed: Oct. 29, 1985

[51] Int. Cl.⁴ ............................................. F24B 1/26
[52] U.S. Cl. ................................ 126/137; 126/152 B; 126/25 A; 126/336; 99/393
[58] Field of Search ............. 126/25 R, 25 A, 25 AA, 126/30, 9 R, 137, 337 R, 337 A, 339, 336, 152 B; 99/443 R, 393, 396, 421 R

[56] References Cited

U.S. PATENT DOCUMENTS

| | | | |
|---|---|---|---|
| 2,679,243 | 5/1954 | Lee | 126/25 A |
| 2,987,363 | 6/1961 | Morse | 126/337 R |
| 3,311,105 | 3/1967 | Bergel et al. | 126/137 |
| 3,503,324 | 3/1970 | Gmeiner | 99/393 |

Primary Examiner—James C. Yeung
Attorney, Agent, or Firm—Arthur F. Zobal

[57] ABSTRACT

A frame with log holding bars has two sets of arms pivotally coupled to opposite sides and links pivotally coupled to the upper ends of each set of arms such that the links and arms may be pivoted between rear and forward positions. The rear end of a screen is pivotally coupled to the upper ends of the rear arms and to the rear ends of the two links such that the screen may move with the links above the log holding bars and be pivoted to an upward non-operative position and to an operative position next to the links for use for cooking and meat loading and turning purposes.

31 Claims, 19 Drawing Figures

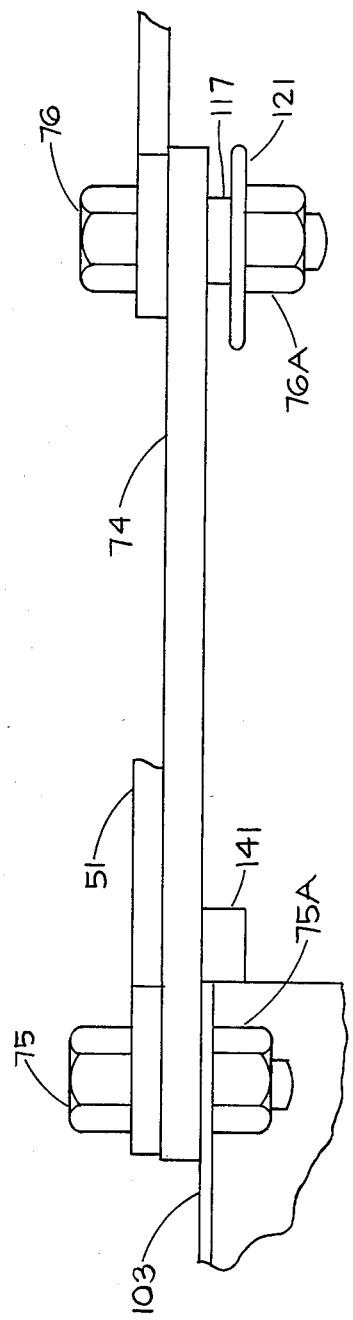

4,627,413

THREE POSITION FIREPLACE COOKER

FIELD OF THE INVENTION

The invention is directed to an apparatus which may be employed in a fireplace for heating and cooking purposes.

SUMMARY OF THE INVENTION

It is an object of the invention to provide an apparatus having a frame with a conventional log rack for normal log burning and movable arms for supporting a food support means which may be moved to a non-operating position, to a cooking position and to a meat loading and turning position.

The apparatus comprises a frame adapted to be supported by a base. The frame has first and second sides and rear and forward ends. Bar means are supported by the frame for holding wood or the like for burning.

A first set of rear and forward arms have lower ends pivotally coupled to said first side of said frame such that said first set of arms may be pivoted between rear and forward positions. A second set of rear and forward arms have lower ends pivotally coupled to said second side of said frame such that said second set of arms may be pivoted between rear and forward positions. A first link has rear and forward ends pivotally coupled to the upper ends of said first set of rear and forward arms respectively forming a first movable support means movable between rear and forward positions. A second link has rear and forward ends pivotally coupled to the upper ends of said second set of rear and forward arms respectively forming a second movable support means movable between rear and forward positions. A food support means having rear and forward ends is provided. The rear end of the food support means is pivotally coupled to the rear and upper ends of said first and second movable support means such that said food support means may be moved with said first and second movable support means between rear and forward positions above said bar means and also may be pivoted: (a) rearward relative to said two links such that said forward end of said food support means is located away from said two links, and (b) next to said forward ends of said two links for supporting food.

In the embodiment disclosed, the rear end of said food support means is pivotally coupled to the upper ends of said rear arms and to the rear ends of said two links.

In a further aspect, the two links are maintained generally level as they are moved to their rear and forward positions. Stop means are coupled to said frame for limiting rear and forward movement of the arms. Means are coupled the forward and upper ends of said first and second support means for providing support for said food support means is pivoted next to said forward ends of said two links. Stop means is coupled to the rear and upper end of at least one of said first and second movable support means for limiting rearward movement of said food support means relative to said two links to a position such that the plane of food support means is generally transverse to the plane formed by said two links.

BRIEF DESCRIPTION OF THE DRAWINGS

FIG. 19 is a top view of a portion of the apparatus of the invention illustrating a support for the front end of the screen. In FIG. 19, the screen is in an upward position.

DESCRIPTION OF THE PREFERRED EMBODIMENT

Figure 1:
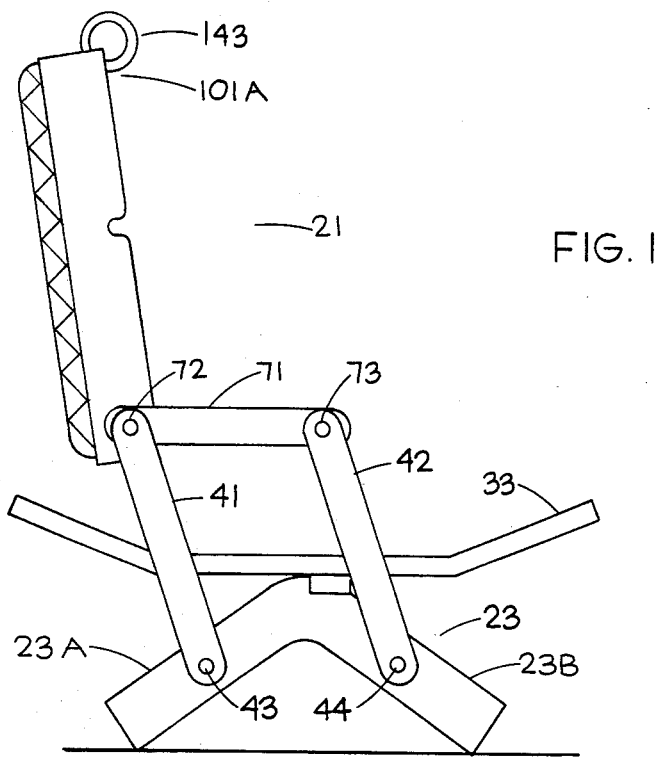
FIG. 1 is a side view of the apparatus of the invention with its screen in an upward position.
Figure 4:
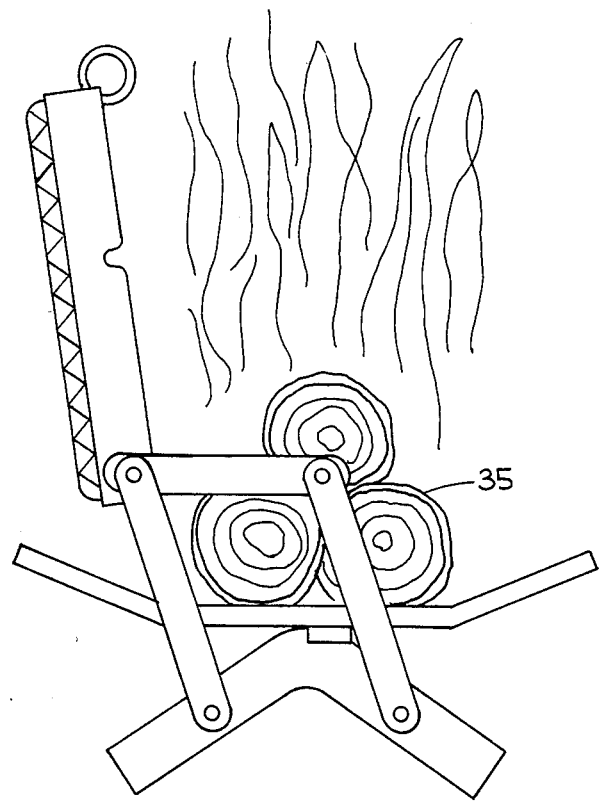
FIG. 4 is a view similar to that of FIG. 1 but with burning logs in the grate of the apparatus.

Referring now to the drawings, the apparatus of the invention is identified by reference numeral 21. It is formed by two leg members 23 and 25 connected together by a bar 27 forming a main frame 29 having two sides defined by leg members 23 and 25 and a rear end 29A and a front end 29B. The legs 23A, 23B and 25A, 25B of the frame are adapted to rest on a base 31 of a fireplace. The bar member 27 may be welded to the leg members 23 and 25. Welded to the bar 27 are a plurality of spaced apart bars 33 forming a grate for holding lengths of logs illustrated at 35 for burning.

Pivotally coupled to leg members 23 and 25 and hence to opposite sides of the main frame 29 are two sets of rear and forward arms 41, 42 and 51, 52 respectively. The lower ends of arms 41 and 42 are pivotally coupled to legs 23A and 23B by bolts 43 and 44 and the lower ends of arms 51 and 52 are pivotally coupled to legs 25A and 25B by bolts 53 and 54. Bolt 43 extends through apertures 61 and 62 formed through the lower end of rear arms 41 and through legs 23A and bolt 44 extends through apertures 63 and 64 formed through the lower end of forward arm 42 and through leg 23B. Bolt 53 extends through apertures 65 (not shown) and 66 formed through the lower end of rear arm 51 and through leg 25A and bolt 54 extends through apertures 67 and 68 formed through the lower end of forward arm 52 and through legs 25B. The nuts for the bolts 43, 44, 53, 54 are not shown.

Figure 2:
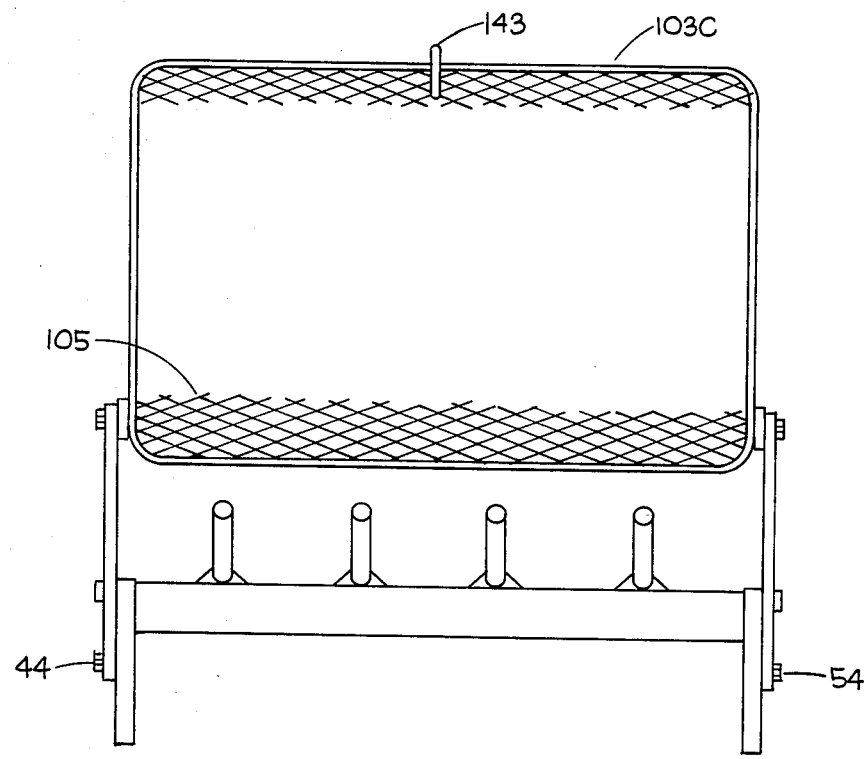
FIG. 2 is a front view of the apparatus of the invention with its screen in an upper position.
Figure 3:
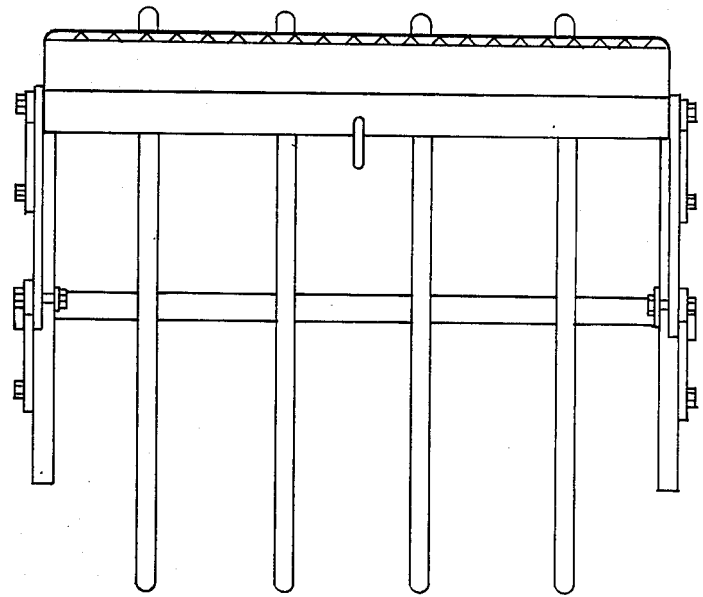
FIG. 3 is a top view of the apparatus of the invention with its screen in an upper position.

The upper ends of arms 41 and 42 are pivotally coupled to the rear and forward ends of a link 71 by bolts 72 and 73 such that the arms 41 and 42 and link 71 can pivot between rear and forward positions as shown in FIGS. 1 and 2. The upper forward ends of a link 74 by bolts 75 and 76 such that arms 51 and 52 and link 74 can pivot between rear and forward positions similar to that shown in FIGS. 1 and 2.

Bolt 72 extends through apertures 81 and 82 formed through the upper end of arm 41 and through the rear end of link 71 and bolt 73 extends through apertures 83 and 84 formed through the upper end of arm 42 and through the forward end of link 71. Bolt 75 extends through apertures 85 and 86 formed through the upper end of arm 51 and through the rear end of link 74 and bolt 76 extends through apertures 87 and 88 formed through the upper end of arm 52 and through the rear end of link 74. The nuts for bolts 72 and 73 are not shown although the nuts for bolts 75 and 76 are shown at 75A and 76A in FIG. 19.

The distances between the centers of apertures 61 and 81, 63, and 83, 65 and 85, and 67 and 87 of arms 41, 42, 51, 52 are the same and the distances between the centers of apertures 62 and 64, 82 and 84, 66 and 68, and 86 and 88 are the same such that links 71 and 74 are maintained parallel to each other and to the plane defined by leg apertures 62, 64, 66 and 68 as they are pivoted between their forward and rear positions. Thus links 71 and 74 will be maintained level as they are moved to their forward and rear positions when the frame is placed on a level base.

Figure 5:
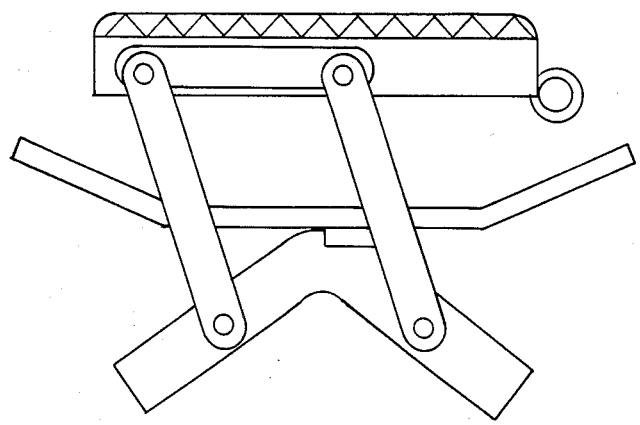
FIG. 5 is a side view of the apparatus of the invention with its screen in a cooking position.
Figure 8:
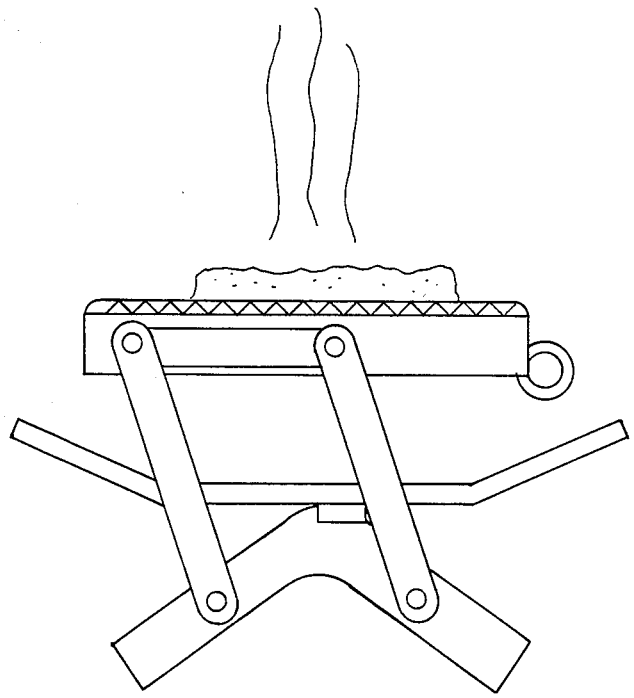
FIG. 8 is a view similar to that of FIG. 5 but with meat on the screen.
Figure 6:
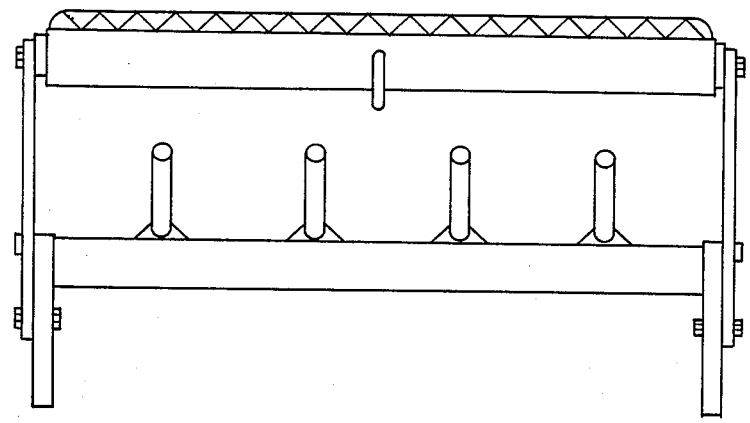
FIG. 6 is a front view of the apparatus of the invention with its screen in a cooking position.
Figure 9:
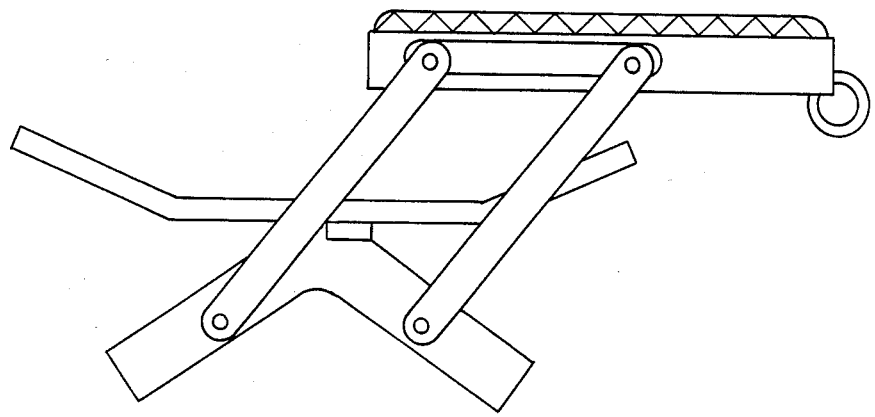
FIG. 9 is a side view of the apparatus of the invention with its screen in a meat loading or turning position.
Figure 12:
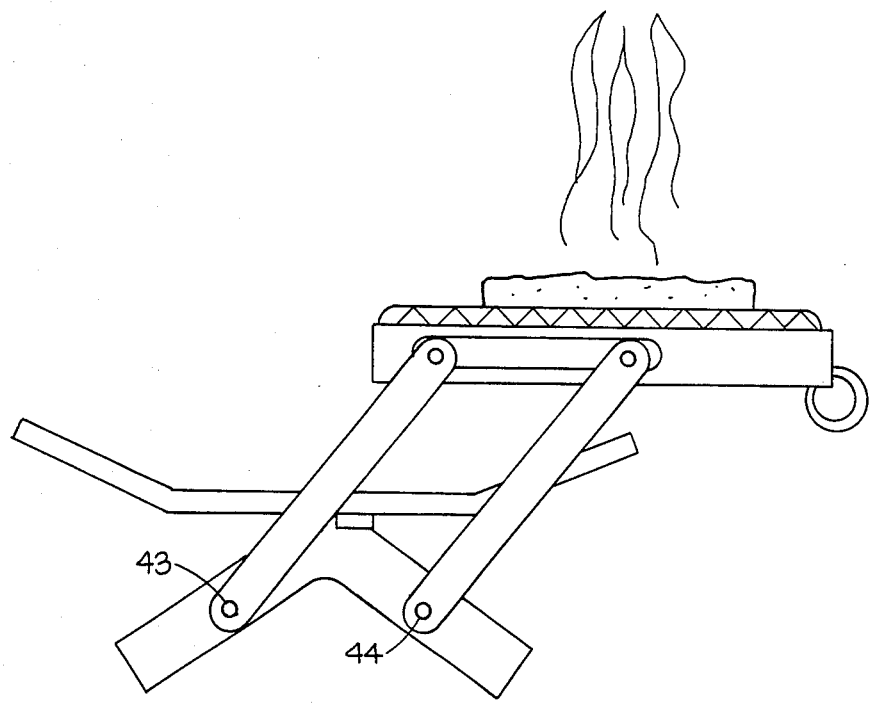
FIG. 12 is a view similar to that of FIG. 9 but with meat on the screen.
Figure 10:
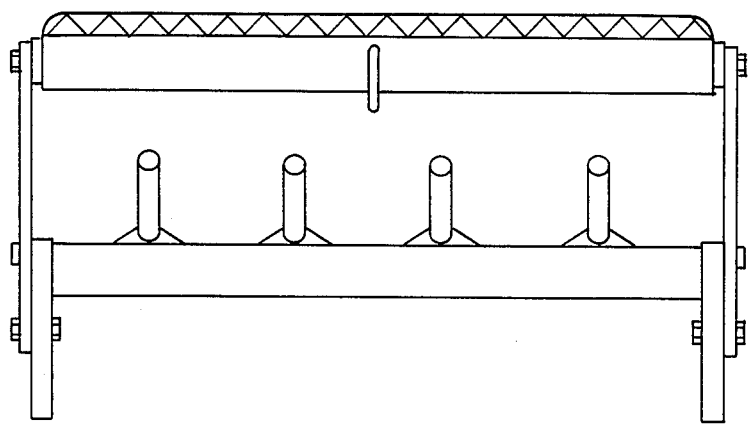
FIG. 10 is a front view of the apparatus of the invention with its screen in a meat loading or turning position.

Arms 41, 42, and link 72 and arms 51, 52 and link 74 form two movable supports for a screen 101 formed by a screen frame 103 and a screen member 105 connected to the frame 103 and employed for supporting meat or the like. The screen frame 103 has its rear end pivotally coupled to bolts 72 and 75 on the inside of links 71 and 74 such that the screen 101 may move with the links 71 and 74 and also be pivoted relative to the links to an upward inoperative position next to the links as shown in FIG. 1 and to a downward operative position next to the links as shown in FIGS. 5 and 9. In the upward inoperative position of the screen, its forward end 101A is located away from the links 71 and 74. The bolts 72 and 75 extend through apertures 107 and 109 formed through the rear ends of side portions 103A and 103B of the frame 103. The screen frame side portions 103A and 103B have notches 111 and 113 formed in their lower ends such that they will fit around and engage tubular spacers 115 and 117 located around the shanks of bolts 73 and 76 inward of the links 71 and 74 to support the other end of the screen when it is located in its operative position as shown in FIGS. 5 and 9. In this position the plane of the screen 101 will be parallel to the plane formed by links 71 and 74. Washers 119 and 121 are held next to the inner ends of the spacers 115 and 117 by nuts screwed to the bolts 73 and 76.

Stops 131 and 133 are welded to the outside of leg members 23 and 25 to limit the rearward movement of the arms 41, 42, and 51, 52. When the arms 41, 42 and 51, 52 are moved rearward, arms 42 and 52 will engage the stops 131 and 133 and be prevented from moving further rearward than the position shown in FIG. 1.

Figure 16:
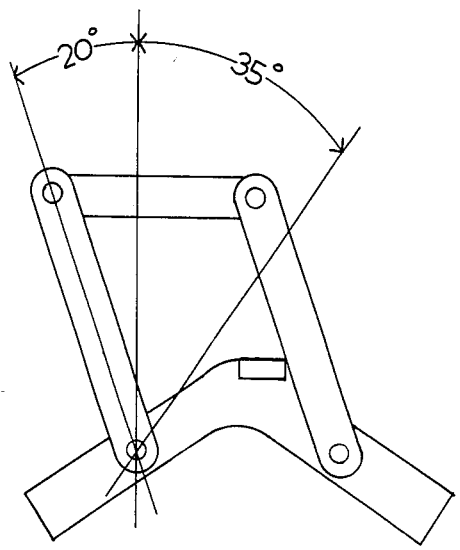
FIG. 16 illustrates the degree of rearward and forward movement of the arms and links of the apparatus of the invention.
Figure 17:
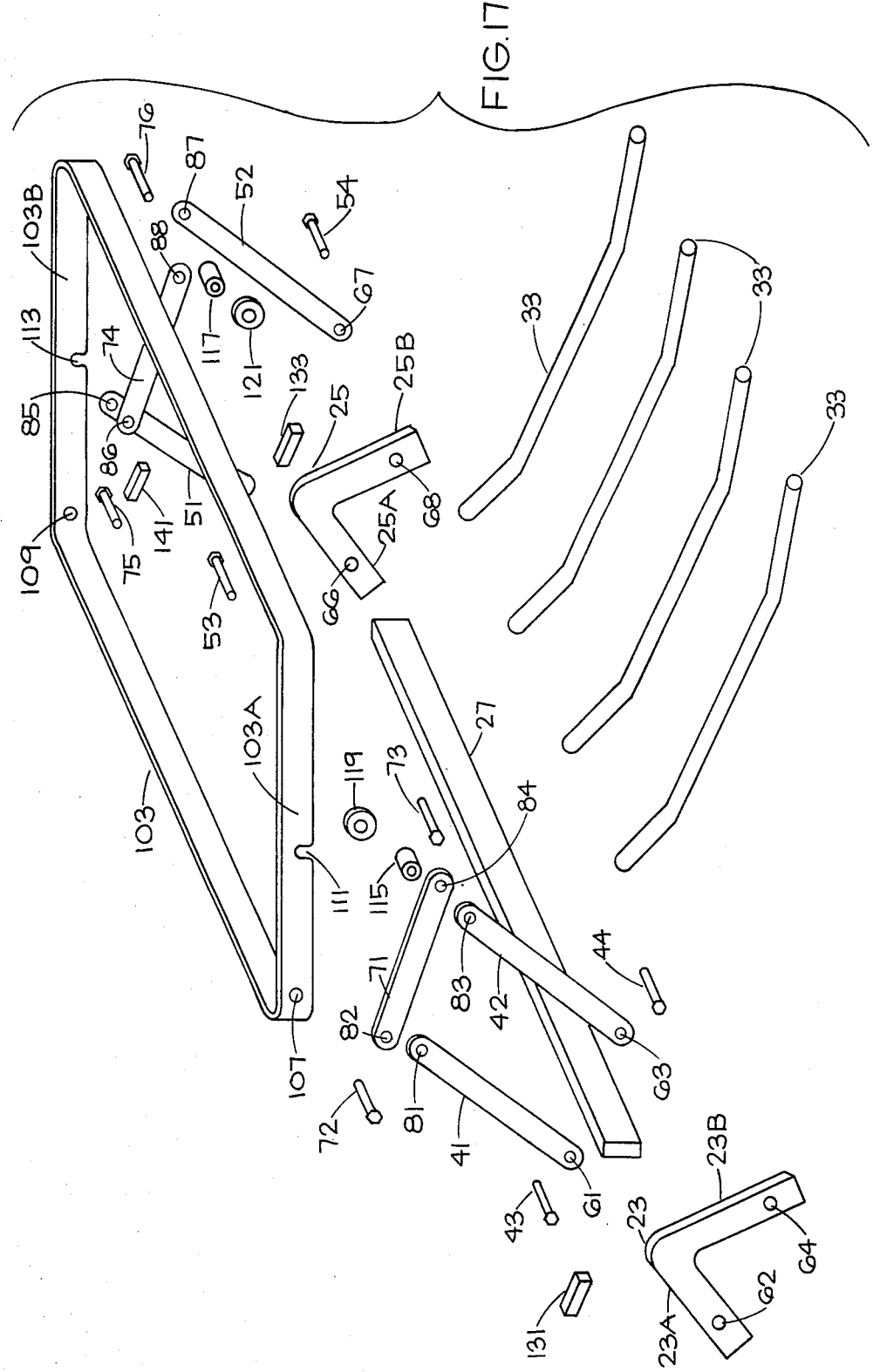
FIG. 17 is an exploded view of the apparatus of invention.

When arms 41,42 and 51, 52 are moved forward, arms 41 and 51 will engage the stops 131 and 133 and be prevented from moving further forward than the position shown in FIG. 9. Preferably the stops 131 and 133 are located such that the each of the arms will form a maximum angle of 20° relative to a vertical line from its lower pivot point when the arms are moved to their maximum rearward position and each of the arms will form a maximum angle of 35° relative to a vertical line from its lower pivot point when the arms are moved to their maximum forward position as illustrated in FIG. 16.

Figure 18:
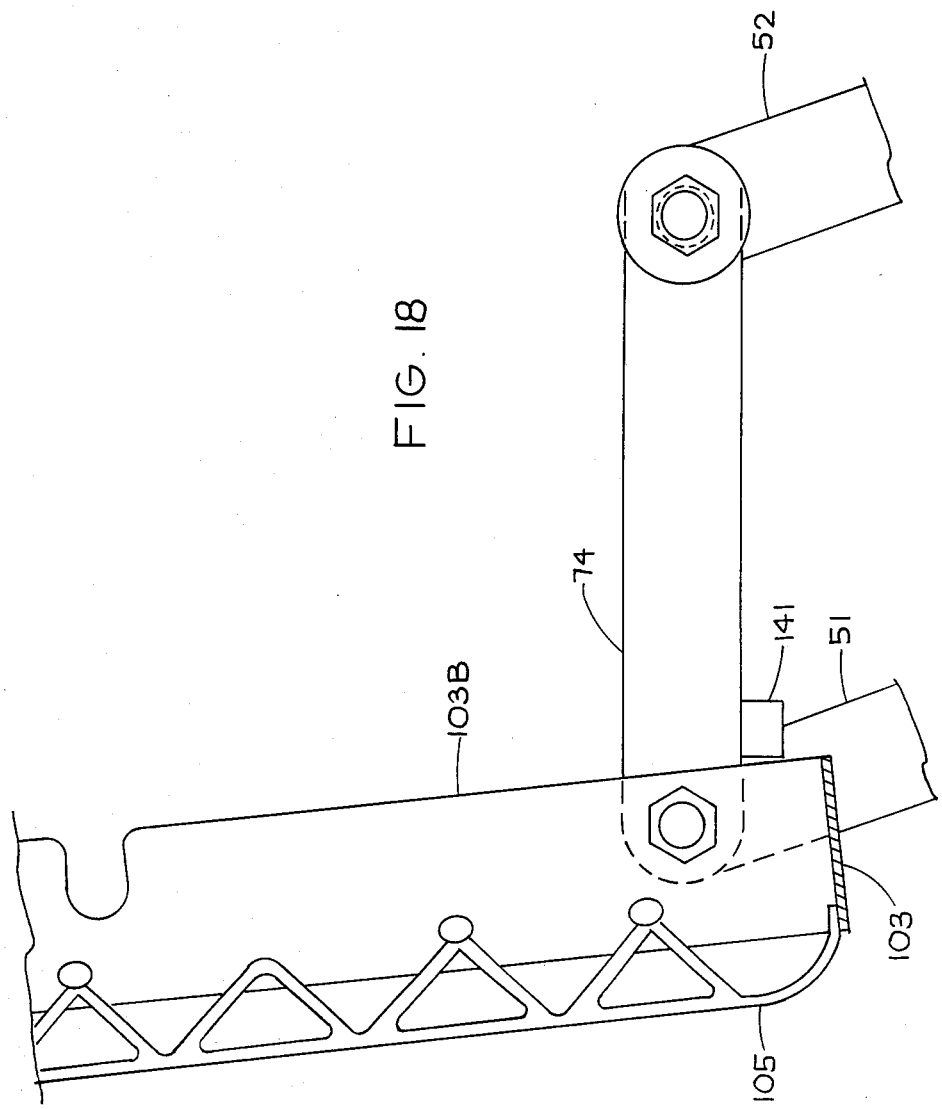
FIG. 18 is a side view of a portion of the apparatus of the invention illustrating a stop for limiting rearward movement of the screen.

A stop 141 also are welded to the rear and bottom end of link 74 to limit rearward pivotal movement of the screen 101 relative to the linkages as shown in FIG. 18. In this position the lower end of the rear side portion 103B of the frame 103 engages the stop 141 and prevents further rearward movement of the screen relative to the link 71 and 74. When the screen 101 is pivoted to its maximum rearward position relative to the links 71 and 74, the plane of the screen 101 forms an angle relative to the plane of the links which is somewhat greater than 90° to allow the screen to remain in that position until moved downward to its operative position.

The fireplace cooker can be used as a conventional log rack for normal log burning, which is the log burning position of FIGS. 1–4. In this position, the arms and links are moved to their maximum rearward position and the screen 101 is pivoted to its rearward and upward position out of the way of the logs and the fire. When used for cooking with wood coals, the logs are burned until the coals have fallen through the log rack and the screen 101 is lowered with a poker to the cooking position as seen in FIGS. 5–8. In this position, the arms and links are in their maximum rearward position and the screen 101 is lowered until the frame portions 103A and 103B at their notches 111 and 113 seat against the spacers 115 and 117 such that the screen 101 is directly over the grate and the hot coals. The arms and links and the screen 101 in its lowered position can be pulled forward by a poker above the grate to a meat loading and turning position as seen in FIGS. 9–12, where meat or other food to be cooked is placed on the screen 101 or turned. This position is forward of the log rack for easy placement of the food, or for turning or seasoning out of the flame or heat area of the hot coals. The screen 101 then is pushed back to the cooking position with the poker to cook and smoke the food.

The forward end 103A of the frame 103 of the screen has a loop 143 welded thereto to facilitate movement with a poker.

All of the parts of the cooker preferably are of steel of a quality equal to a minimum of the ASTM A-36 specifications.

The parts may have sizes as listed below:

| PART | DESCRIPTION | SIZE | MATERIAL THICK WIDE |
|---|---|---|---|
| 27 | Main Frame | 14" to 18" | ⅜" × 1" bar |
|  | Main Frame | 19" to 24" | ⅜" × 1¼ bar |
|  | Main Frame | 25" to 28" | ⅜ × 1½" bar |
| 23,25 | Legs (ends) | Diff. Sizes | ¼" × 1½ bar |
| 41,42,51, 52 | Arms | " | ¼" × 1" bar |
| 71,72 | Links or Carriage Frames | " | ¼" × 1" bar |
| 131,133 | Forward and rear Stops | " | ⅜" × square bar |
| 115, 117 | Tube spacers | " | ⅜" ID 9/16" OD |

-continued

| PART | DESCRIPTION | MATERIAL SIZE | THICK WIDE |
|---|---|---|---|
| 119,121 | Side Thrust Washers | " | ⅜" flat washer |
| 33 | Log Bars | " | ⅜" round or square by 16" long |
| 103 | Cooking screen Frame | " | ⅛" × 1½" flat bar |
| 105 | Cooking screen | " | Light expanded metal |
| 141 | Cooking screen vertical stop | " | ⅜" square |
| 43,44,53, 54 | Pivot Shafts | " | ⅜" headed bolts welded studs or rivets |
| 72,73 75,76 | Pivot shafts | " | ⅜" headed bolts welded studs or rivets |

The amount of horizontal travel of the links 71,74 and hence of the screen 101 from the cooking position of FIGS. 5-8 to the meat loading or turning position of FIGS. 9-12 depends on the length of the arms 41,42,51,52 and the horizontal position and the height of the stops 131, 133 above the lower arm pivot points on the legs. All four legs have precision drilled or punched holes for the pivot shafts. Precision holes should be 0.005" larger than pivot shafts. Pivot shafts can be steel bolts ⅜" diameter welded studs, riveted. The arms, links and the cooking grill or screen should have minimum side clearance between the head of the pivot and the moving piece but with free movement allowed. The distance between the centers of hole 107 and notch 111 and between the centers of hole 109 and notch 113 is equal to the distance between the centers of holes 82 and 84, 62 and 64, 86 and 88, and 66 and 68.

In the operative cooking or meat loading or turning position of the screen, the screen is held in place by the notches 111 and 113 in the frame 103 seating on the short tube spacers 115 and 117 located around bolts 73 and 76. The tube spacers must be short enough such that when used in conjunction with a large round flat washer they will act as a side thrust bearing from the rigid screen frame 103 to the flexible arm and links or carriage frames to prevent spreading and to give a smooth front to rear movement when moving the cooking screen with the center poker ring in and out to cook and position meat or other food.

The bar 27 is precision jigwelded to the leg members 23 and 25. All holes are positioned square to vertical, square to horizontal and parallel for the cooking screen to function smoothly in movement between all three positions. All parts should be assembled with a minimum of clearance that will allow free movement through the three positions.

Figure 7:
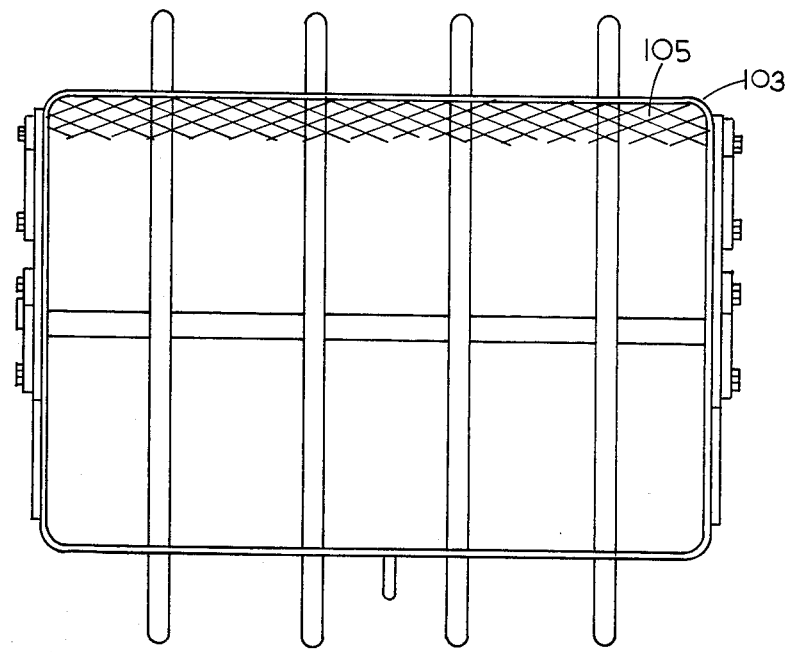
FIG. 7 is a top view of the apparatus of the invention with its screen in a cooking position.
Figure 11:
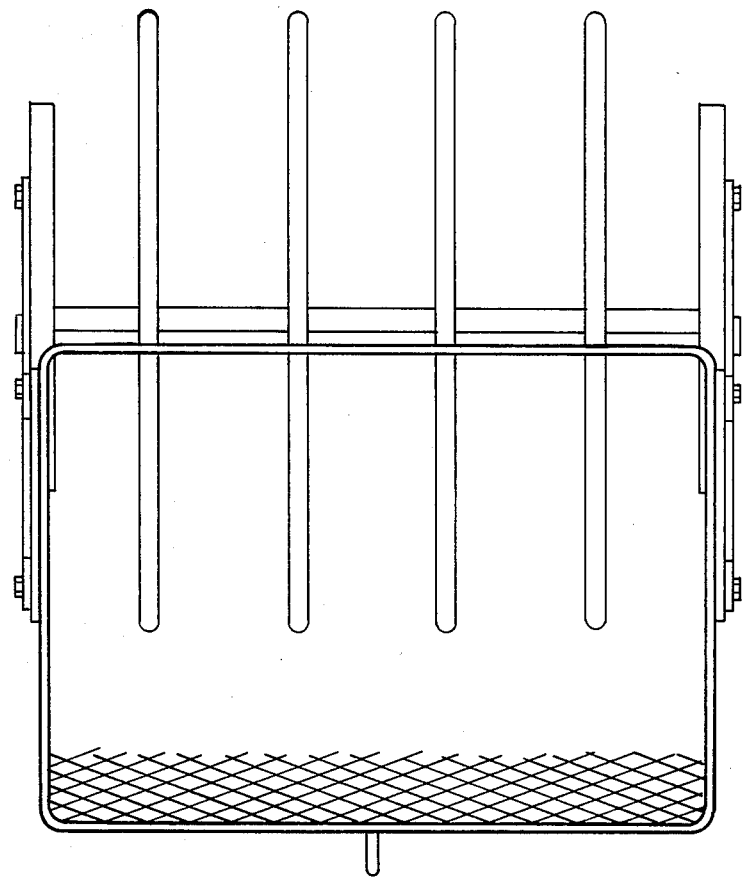
FIG. 11 is a top view of the apparatus of the invention with its screen in a meat loading or turning position.
Figure 13:
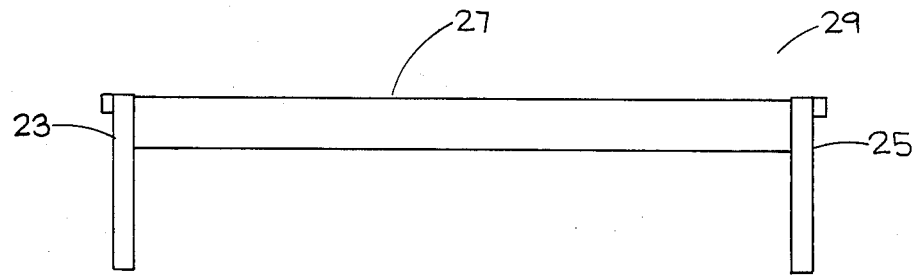
FIG. 13 is a front view of the frame of the apparatus of the invention.
Figure 14:
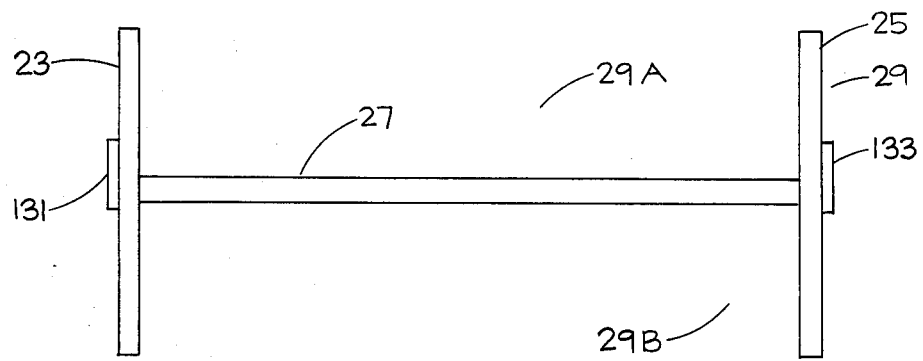
FIG. 14 is a top view of the frame of the apparatus of the invention.
Figure 15:
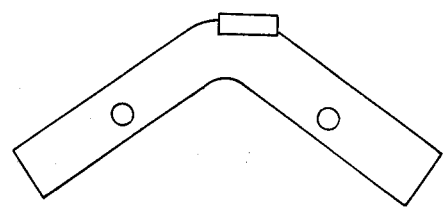
FIG. 15 is a side view of the frame of the apparatus of the invention.

In FIGS. 2, 7, and 11, the screen member 105 is not shown in full for purposes of clarity.

I claim:

1. A heating and cooking apparatus, comprising:
   a frame adapted to be supported by a base, said frame having first and second sides and rear and forward ends,
   bar means supported by said frame for holding wood or the like to be burned,
   a first set of rear and forward arms having lower ends pivotally coupled to said first side of said frame such that said first set of arms may be pivoted between rear and forward positions,
   a second set of rear and forward arms having lower ends pivotally coupled to said second side of said frame such that said second set of arms be pivoted between rear and forward positions,
   first link means having rear and forward ends pivotally coupled to the upper ends of said first set of rear and forward arms respectively forming a first movable support means movable between rear and forward positions,
   second link means having rear and forward ends pivotally coupled to the upper ends of said second set of rear and forward arms respectively forming a second movable support means movable between rear and forward arms positions,
   food support means having rear and forward ends,
   the rear end of said food support means being pivotally coupled to the rear and upper ends of said first and second movable support means such that said food support means may be moved with said first and second movable support means between said rear and forward positions above said bar means and also may be pivoted:
   (a) rearward relative to said first and second link means such that said forward end of food support means is located away from said first and second link means, and
   (b) next to said forward ends of said first and second link means for supporting food.

2. The heating and cooking apparatus of claim 1, comprising:
   stop means coupled to said frame for limiting rear and forward movement of said arms.

3. The heating and cooking apparatus of claim 1, wherein:
   said first and second link means are maintained generally parallel with a plane defined by the bottom of said frame as said first and second links means are moved to their rear and forward positions.

4. The heating and cooking apparatus of claim 1, comprising:
   means coupled to the forward and upper ends of said first and second support means for providing support for said food support means forward of its rear end when said food support means is pivoted next to said forward ends of said first and second link means.

5. The heating and cooking apparatus of claim 1, comprising:
   stop means coupled to the rear and upper ends of at least one of said first and second movable support means for limiting rearward movement of said food support means relative to said first and second link means to a position such that the plane of food support means is generally transverse to the plane formed by said first and second link means.

6. The heating and cooking apparatus of claim 1, wherein said rear end of said food support means is pivotally connected to the rear and upper ends of said first and second movable support means.

7. The heating and cooking apparatus of claim 1, comprising:
   first and second pin means for pivotally coupling the rear end of said food support means to the rear and upper ends of said first and second movable support means for allowing only pivotal movement of said food support means relative to said first and second movable support means.

8. A heating and cooking apparatus, comprising:

a frame adapted to be supported by a base, said frame having first and second sides and rear and forward ends, bar means supported by said frame for holding wood or the like to be burned, a first set of rear and forward arms having lower ends pivotally coupled to said first side of said frame such that said first set with arms may be pivoted between rear and forward positions, a second set of rear and forward arms having lower ends pivotally coupled to said second side of said frame such that said second set of arms be pivoted between rear and forward positions, first link means having rear and forward ends pivotally coupled to the upper ends of said first set of rear and forward arms respectively for movement between rear and forward positions, second link means having rear and forward ends pivotally coupled to the upper ends of said second set of rear and forward arms respectively for movement between rear and forward positions, food support means having rear and forward ends, the rear end of said food support means being pivotally coupled to the rear ends of said first and second link means and to the upper ends of said rear arms such that said food support means may be moved with said first and second link means between said rear and forward positions above said bar means and also may be pivoted:

(a) rearward relative to said first and second link means such that said forward end of food support means is located away from said first and second link means, and, (b) next to said forward ends of said first and link means for supporting food.

9. The heating and cooking apparatus of claim 8, wherein:

said first and second link means are maintained generally parallel with a plane defined by the bottom of said frame as said first and second link means are moved to their rear and forward positions.

10. The heating cooking apparatus of claim 8, wherein:

said first and second link means are maintained generally parallel with a plane defined by the bottom of said frame as said first and second link means are moved to their rear and forward positions.

11. The heating and cooking apparatus of claim 8, comprising:

means coupled to the forward ends of said first and second link means and to the upper ends of said forward arms for providing support for said food support means forward of its rear end when said food support means is pivoted next to said forward ends of said first and second link means.

12. The heating and cooking apparatus of claim 8, comprising:

stop means coupled to the rear end of at least one of said first and second link means for limiting rearward movement of said food support means relative to said first and second link means to a position such that the plane of said food support means is generally transverse to the plane formed by said first and second link means.

13. The heating and cooking apparatus of claim 8, comprising:

first and second pin means for pivotally coupling the rear end of said food support means to the rear ends of said first and second link means and to the upper ends of said rear arms for allowing only pivotal movement of said food support means relative to said first and second link means and relative to the upper ends of said rear arms.

14. A heating and cooking apparatus, comprising:

first and second spaced apart side leg means coupled together by structure forming a frame adapted to rest on a supporting base, a plurality of spaced apart bar means connected to said frame above the lower ends of said legs for holding wood or the like to be burned, said frame having first and second sides, a forward end and a rear end, a first set of rear and forward arms having lower ends pivotally coupled to said first side of said frame at spaced apart rear and forward pivot points respectively, a second set of rear and and forward arms having lower ends pivotally coupled to said second side of said frame at spaced apart rear and forward pivot points respectively, first link means having rear and forward ends pivotally coupled to the upper ends of said first set of rear and forward arms by first upper rear and forward pivot means respectively such that said first set of rear and forward arms and said first link means may be pivoted between rear and forward positions, second link means having rear and forward ends pivotally coupled to the upper ends of said second set of rear and forward arms by second upper rear and forward pivot means respectively such that said second set of rear and forward arms and said second link means may be pivoted between rear and forward positions, a screen means having first and second sides and rear and forward ends, the rear portions of said first and second sides of said screen means being pivotally coupled to said first and second upper rear pivot means respectively such that said screen means may be moved with said arms and said first and second link means above said bar means and also may be pivoted to a rearward position relative to said first and second link means such that said forward end of said screen means is spaced away from said first and second links means and to a position next to the forward ends of said first and second link means such that screen means is generally parallel to said first and second link means.

15. The heating and cooking apparatus of claim 14, comprising:

stop means coupled to said frame for limiting rear and forward movement of said arms.

16. The heating and cooking apparatus of claim 15, wherein:

said first and second link means are maintained generally parallel with a plane defined by said rear and forward pivot points as said first and second link means are moved to their rear and forward positions.

17. The heating and cooking apparatus of claim 15, comprising:

means coupled to said first and second upper forward pivot means for providing support for said screen means forward of its rear end when said screen means is pivoted next to said forward ends of said first and second link means.

18. The heating and cooking apparatus of claim 15, wherein:
said first and second link means are maintained generally parallel with a plane defined by said rear and forward pivot points as said first and second link means are moved to their rear and forward positions,
means coupled to said first and second upper forward pivot means for providing support for said screen means forward of its rear end when said screen means is pivoted next to said forward ends of said first and second link means.

19. The heating and cooking apparatus of claim 15, comprising:
stop means coupled to the rear end of at least one of said first and second link means for limiting rearward movement of said screen means relative to said first and second link means to a position such that the plane of said screen means is generally transverse to the plane formed by said first and second link means.

20. The heating and cooking apparatus of claim 15, wherein:
said first and second link means are maintained generally parallel with a plane defined by said rear and forward points as said first and second link means are moved to their rear and forward position,
stop means coupled to the rear end of at least one of said first and second link means for limiting rearward movement of said screen means relative to said first and second link means to a position such that the plane of said screen means is generally transverse to the plane formed by said first and second link means.

21. The heating and cooking apparatus of claim 15, wherein:
said first and second link means are maintained generally parallel with a plane defined by said rear and forward pivot points as said first and second link means are moved to their rear and forward positions,
means coupled to said first and second upper forward pivot means for providing support for said screen means forward of its rear end when said screen means is pivoted next to said forward ends of said first and second link means,
stop means coupled to the rear end of at least one of said first and second link means for limiting rearward movement of said screen means relative to said first and second link means to a position such that the plane of said screen means is generally transverse to the plane formed by said first and second link means.

22. The heating and cooking apparatus of claim 15, wherein:
said first and second link means are maintained generally parallel with a plane defined by said rear and forward pivot points as said first and second link means are moved to their rear and forward positions,
means coupled to said first and second upper forward pivot means for providing support for said screen means forward of its rear end when said screen means is pivoted next to said forward ends of said first and second link means,
stop means coupled to the rear end of at least one of said first and second link means for limiting rearward movement of said screen means relative to said first and second link means to a position such that the plane of said screen means is generally transverse to the plane formed by said first and second link means.

23. The heating and cooking apparatus of claim 14, wherein:
said first and second link means are maintained generally parallel with a plane defined by said rear and forward pivot points as said first and second link means are moved to their rear and forward positions.

24. The heating and cooking apparatus of claim 23, comprising:
means coupled to said first and second upper forward pivot means for providing support for said screen means forward of its rear end when said screen means is pivoted next to said forward ends of said first and second link means.

25. The heating and cooking apparatus of claim 23, comprising:
stop means coupled to the rear ends of at least one of said first and second means for limiting rearward movement of said screen means relative to said first and second link means to a position such that the plane of said screen means is generally transverse to the plane formed by said link means.

26. The heating and cooking apparatus of claim 23, comprising:
means coupled to said first and second upper forward pivot means for providing support for said screen means forward of its rear end when said screen means is pivoted next to said forward ends of said first and second link means,
stop means coupled to the rear end of at least one of said first and second link means for limiting rearward movement of said screen means relative to said first and second link means to a position such that the plane of said screen means is generally transverse to the plane formed by said first and second link means.

27. The heating and cooking apparatus of claim 14, comprising:
means coupled to said first and second upper forward pivot means for providing support for said screen means forward of its rear end when said screen means is pivoted next to said forward ends of said first and second link means.

28. The heating and cooking apparatus of claim 27, comprising:
stop means coupled to the rear end of at least one of said first and second link means for limiting rearward movement of said screen means relative to said first and second link means to a position such that the plane of said screen means is generally transverse to the plane formed by said first and second link means.

29. The heating and cooking apparatus of claim 14, comprising:
stop means coupled to the rear end of at least one of said first and second link means for limiting rearward movement of said screen means relative to said first and second link means to a position such that the plane of said screen means is generally transverse to the plane formed by said first and second link means.

30. The heating and cooking apparatus of claim 14, wherein:
said first and second upper rear pivot means allow only pivotal movement of said screen means relative to said arms and relative to said first and second link means.

31. The heating and cooking apparatus of claim 14 wherein said first and second upper rear pivot means extend through apertures formed through the rear portions of said first and second sides of said screen means, through apertures formed through said rear ends of said first and second link means and through apertures formed through the upper ends of said rear arms of said first and second set of arms respectively.

* * * * *